United States Patent [19]

Markin et al.

[11] Patent Number: 4,476,200
[45] Date of Patent: Oct. 9, 1984

[54] GALVANIC CELL AND SEALING AND INSULATION MEMBER THEREFOR

[75] Inventors: Charles Markin; Ronald J. Book, both of Toronto; Michael J. Smith; Marian Wiacek, both of Mississauga, all of Canada

[73] Assignee: Duracell Inc., Bethel, Conn.

[21] Appl. No.: 446,115

[22] Filed: Dec. 2, 1982

[30] Foreign Application Priority Data

Dec. 23, 1981 [CA] Canada .................................. 393134

[51] Int. Cl.³ ............................................ H01M 2/12
[52] U.S. Cl. ...................................... 429/56; 429/174; 429/185
[58] Field of Search .................. 429/56, 163, 164, 171, 429/172, 174, 175, 185

[56] References Cited

U.S. PATENT DOCUMENTS

| | | | |
|---|---|---|---|
| 3,276,912 | 10/1966 | Pun | 429/172 X |
| 3,623,915 | 11/1971 | Pun et al. | 429/173 |
| 4,052,533 | 10/1977 | Heinz, Jr. | 429/171 X |
| 4,074,022 | 2/1978 | Nadal | 429/54 |
| 4,146,681 | 3/1979 | Spanur | 429/172 X |
| 4,191,806 | 3/1980 | Levy | 429/56 |
| 4,237,203 | 12/1980 | Tsuchida | 429/56 X |
| 4,309,493 | 1/1982 | Kuhl et al. | 429/172 |

Primary Examiner—Anthony Skapars
Attorney, Agent, or Firm—Ronald S. Cornell; Israel Nissenbaum

[57] ABSTRACT

In a sealed galvanic cell having an anode, cathode, and cylindrical can into which the principal components of the cell are assembled, a sealing and insulating member at the top end of the cathode can is provided which is held in sealing relationship to the can by a crimp formed over the top edge thereof. The sealing and insulating member has a circular rim formed at its periphery in at least one of the top and bottom surfaces, the diameter of the sealing and insulating member being substantially the same as the inside diameter of the can above a bead which is formed near the top edge thereof. At least a portion of the thickness of the peripheral material of the member is stressed by the crimp in an amount greater than the elastic limit of the material, and at least another portion of the thickness of the peripheral material of the sealing and insulating member is stressed in an amount less than the elastic limit. The stressed portion is at the top or bottom of the periphery of the member. When the can is sealed by crimping over the member, a change of elevation of at least the central portion of the sealing and insulating member may occur, or inward flexing of the peripheral rib may occur, or both.

8 Claims, 7 Drawing Figures

GALVANIC CELL AND SEALING AND INSULATION MEMBER THEREFOR

FIELD OF THE INVENTION

This invention relates to sealed galvanic cells, such as primary alkaline cells and others, and particularly relates to a sealing and insulating member for such cells. Such sealing and insulating members, according to the present invention, may be used in cells where a rupturable vent membrane is required; and a variety of materials including especially polypropylene and co-polymers thereof are particularly utilized according to the present invention.

BACKGROUND OF THE INVENTION

The general construction of sealed, cylindrical galvanic cells is such that the principal components, an anode and cathode, are assembled into a can, together with the appropriate separators, electrolyte, etc. Generally, the can into which the principal cell components are assembled is a cathode can—i.e., the can, and usually the closed bottom end thereof, forms a cathode contact for the cell—and the cell is closed by a member placed in the top end of the can. Such member is generally a sealing and insulating member, by which the cell is sealed so as to preclude electrolyte leakage therefrom, and so that the anode contact of the cell is insulated from the can at the opposite end thereof from its closed bottom end.

However, the sealing and insulating member for the sealed galvanic cell may serve several purposes, and ideally is designed so that it will assure sealing of the galvanic cell during and after deep discharge operations and/or during or after severe temperature cycling. Ordinary commercial galvanic cells such as primary alkaline cells and others are, indeed, tested to determine whether the sealing will remain integral following deep discharge or reverse polarity connections, or temperature cycling; but the severity of the cell tests may vary, depending upon the type of cell.

Moreover, it is often desired that a sealed galvanic cell should be provided having a rupturable vent membrane in the sealing member, such that if extreme pressures develop beyond a predetermined limit within the cell, the membrane will rupture thereby permitting a controlled release of gas—and, usually, some of the cell components—without the danger of the entire cell disintegrating or exploding in an uncontrolled manner.

Still further, it has always been desirable that the material of the sealing and insulating member which is placed at the top of the cell can should be substantially inert to the cell components that are within the can.

It has been the general rule, however, that not all of the above requirements have been met by any one sealing and insulating member. One of the severe problems that is encountered in the provision of a sealing and insulating member is that, normally, it would be expected that a material having substantial mechanical rigidity and tensile strength, and having co-efficients of thermal expansion very similar to those of steel—the material of which the galvanic cell can would normally be produced—should be used. Such materials generally comprise nylon. However, vinyl and polyethylene have also been materials that have been widely considered and used.

Certain of the prior art has been directed toward the provision of sealing and insulating members which possess certain physical properties, and which may also provide sealing gaskets or members which have provision to permit pressure relief from the interior of the cell if the pressure therein exceeds a predetermined maximum. For example, British patent specification No. 1,517,137, published July 12, 1978, shows a sealing element which may be made of a synthetic resin material having rubber-elastic properties, and in one embodiment provides such a sealing element with a diaphragm. That patent, however, is particularly directed to a sealing element having a self-locking engagement when positioned in the cell can, and the pressure diaphragm is provided to permit pressure relief without losing the locking engagement of the sealing member with the can. The member is provided having a bore through which an electrically conductive member can be inserted.

Southworth, in U.S. Pat. No. 3,219,488 issued Nov. 23, 1965, provides a sealing gasket member for alkaline galvanic cells, where a combined blow-out and gas-permeable membrane is provided in the sealing member. In that case, the member is generally made of nylon, and a specific embodiment is necessary so that there is a point of localized stressed for the blow-out membrane, over which a metal washer is placed.

Carmichael et al, in U.S. Pat. No. 3,218,197, issued Nov. 16, 1965, provide a similar membrane arrangement, in a gasket member which is made of a plastic that must have resistance to cold flow. However, that patent, and the others, makes no reference or consideration to sealing the cell during or after severe temperature cycling.

One other approach to the provision of a pressure vent for a sealed primary cell is that taught by Levy in U.S. Pat. No. 4,191,806 issued Mar. 4, 1980. In that case, Levy provides cell membranes in a variety of embodiments, which are injection moulded but which have grooves in the rupturable membrane portion so as to promote rupture at a generally predetermined pressure. Levy suggests that the placing of the grooves in the diaphragm permits the diaphragm to have sufficient thickness to be injection moulded in one step, and yet still to be rupturable at the desired pressure. Moreover, Levy finds that more than one groove is preferable to enable venting at a predetermined pressure, and is limited thereto.

Levy states that materials that he may use are any substantially rigid material such as polysulfone, polyphenylene oxide, polyamides, polypropylene, polyethylene, polystyrene, and acrylonitrile-butadiene-styrene. Any of those materials may be filled with glass; and the preferable materials are ABS, polyamides (nylon), and most particularly polyphenylene oxide and polypropylene.

However, as noted, Levy must provide at least two grooves in the rupturable diaphragm because otherwise, he says, it is not possible to mould the plastics so as to assure that the rupturing strength of the membrane will be such that blow-out at a predetermined pressure will occur.

We have discovered that, contrary to expectations that would be drawn from any of the prior art referred to above, the use of nylon, polyvinyl chloride or ABS—which are recognized as "engineering plastics'-'—does not necessarily lead to a sealing and insulating member whose integrity can be relied upon, especially following severe temperature cycling, deep discharge or reverse polarity connection, and similar abuses to which a cell might be subjected. Particularly, integrity of the seal to preclude electrolyte leakage from the cell is most difficult to attain.

However, we have discovered quite unexpectedly that, when polypropylene or certain other materials and co-polymers are used, and even when previously used materials as discussed above are used in sealing and insulating members having physical characteristics and properties heretofore not provided, the physical integrity of the sealed cell is much greater than before. Moreover, we have discovered that not only may sealing and insulating members be provided for sealed galvanic cells, such sealing and insulating members can be provided that are injection moulded and may, when necessary, be moulded with rupturable membranes formed therein during the moulding operation but which assure pressure relief venting of the cell at a predetermined pressure. These features are particularly evident when certain polypropylene mono-polymers and co-polymers are utilized, as discussed hereafter.

In providing a sealed galvanic cell according to the present invention—for example, alkaline primary cells, lithium manganese dioxide cells, and others—we have discovered that some provision should be made either for a relative change of elevation of at least part of the sealing and insulating member for the cell with respect to the bottom of the cell can, or flexing of a peripheral rib formed in the sealing and insulating member, or both, when the can is sealed by a crimping action whereby crimping forces are exerted against the material of the can to cold work the can material (usually steel) over the upper and outer peripheral portions of the sealing and insulating member. By such crimping action, the sealing member is held in sealing relationship to the can between the crimp and a bead which is formed near the top edge of the can.

However, when such materials as polypropylene are used, it must also be kept in mind that the thermal coefficient of expansion of polypropylene is quite different than that of steel, unlike that of nylon which is much closer to that of steel. Thus, the sealing and insulating members of the present invention are provided when made of polypropylene (homo-polymers or co-polymers) or other materials as discussed hereafter, wherein cells which have the sealing and insulating members may be submitted to severe temperature cycling, storage at very high or very low temperatures, deep discharge, or combinations of them, without losing the integrity of the seal and thereby providing assurance against electrolyte leakage from the cell.

Still further, we have discovered that, when cells are finally assembled, including driving the current collector through the sealing and insulating member and jacketing the cell, there have heretofore been considerable problems in placing the current collector. Generally, the current collector has the appearance of a nail, and is driven through a central portion of the sealing member at the top of the cell. However, if the member is driven too fast, cracks may occur on the underside of the sealing member for the cell; and moreover, physical damage to the sealing and insulating member may occur such that there may be electrolyte leakage around the current collector, or alternatively such that a significant amount of the material of the sealing member is driven into the interior of the cell so as to affect its operation.

Thus, the present invention provides a sealing and insulating member for a sealed galvanic cell, which permits not only changes of the physical configuration of the sealing member when the member is crimp-sealed into the top of the cell can, but also which assures that the can remains sealed over a wide range of temperatures. Moreover, provision may be made for pressure relief venting of the sealed galvanic cell if the pressure within the cell reaches a predetermined maximum pressure.

These features, and others, are accomplished by the provision of a cylindrical sealed galvanic cell having, in combination, an anode and a cathode placed into a cylindrical cathode can which has a closed bottom end and an open top end, with an inwardly extending bead formed near the top of the can, into which is also placed a sealing and insulating member at the top of the cathode can. The sealing and insulating member is held in sealing relationship to the can by a crimp formed at the top edge of the can, with the top edge of the can extending over the top periphery of the sealing and insulating member. The diameter of the sealing and insulating member is substantially the same as the inside diameter of the can above the bead. The sealing and insulating member has a circular rib formed at its periphery in at least one of its top and bottom surfaces; and at least a first portion of the thickness of the peripheral material of the member is stressed by the crimp in an amount greater than the elastic limit of the material, and at least a second portion of the thickness of the peripheral material of the member is stressed by the crimp in an amount less than the elastic limit of the material. Preferably, the portion which is stressed beyond the elastic limit, is at the top or bottom of the periphery of the sealing and insulating member.

By providing such a sealed galvanic cell, having a sealing and insulating member as discussed above, the present invention provides a sealed galvanic cell which may withstand severe temperature or discharge conditions. Moreover, particularly when the sealing and insulating member is provided using certain homo-polymers or co-polymers of polypropylene, a venting membrane can be provided which assures pressure relief of the cell at a predetermined maximum pressure.

Still further, provision of a sealing and insulating member as spoken immediately above, and having a design at the central portion thereof according to another aspect of the present invention, is such that a current collector member may be driven through the sealing and insulating member with assurance that there will be no electrolyte leakage around the current collector member, and with the further assurance that there will not be any large portion or amount of the material of the sealing and insulating member driven into the interior of the cell so as to affect its operation.

Thus, there is provided by the present invention a galvanic cell and a sealing and insulating member therefore which may have a variety of precise configurations, depending upon the size and type of cell being sealed, but which accomplishes all of the desired characteristics and purposes described above.

BRIEF DESCRIPTION OF THE DRAWINGS

These, and other features and objects of the invention are, however, more fully described hereafter in association with the accompanying drawings, in which.

DESCRIPTION OF THE PREFERRED EMBODIMENTS

As noted, the present invention relates particularly to sealed galvanic cells, the principal components of which are an anode, a cathode, and a generally cylindrical cathode can into which those components are placed. In keeping with the general practice, it is assumed that the cylindrical cathode can is closed at its bottom end and open at its top end. Those matters being universally accepted and general, they are not specifically identified in the accompanying drawings.

Figure 1:
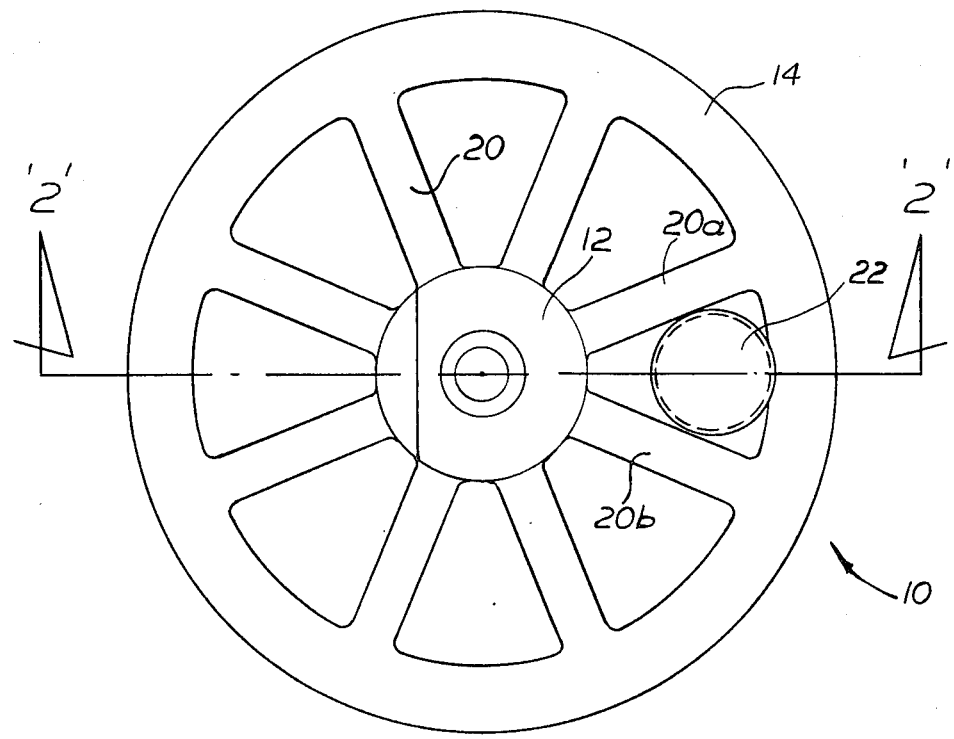
FIG. 1 is a plan view of a typical sealing and insulating member according to the present invention.
Figure 2:
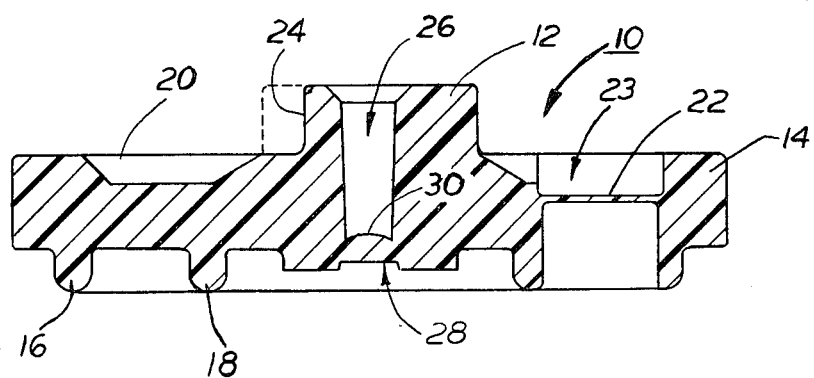
FIG. 2 is a cross sectional view of the member of FIG. 1, in the direction of arrows 2—2.

Referring, however, to FIGS. 1 and 2, there is shown a typical sealing and insulating member which, according to the present invention, is utilized in a sealed galvanic cell and placed in the top end of the cathode can thereof, above the cathode and anode components, electrolyte, separators, etc., that have been previously assembled into the can. The specific sealing and insulating member shown in FIGS. 1 and 2 is not unlike that which may be utilized in sealed alkaline primary cells of the "D" size. Such cells are generally used in flashlights, electric toys and games, and the like.

The sealing and insulating member 10 of FIGS. 1 and 2 has a generally central portion 12 and a peripheral portion 14. On the underside of the member 10 there are formed a pair of circular ribs 16 and 18. However, it is noted that the peripheral portion 14 also forms a circular rib, at the periphery of the member 10.

On the upper side of the member 10, there are formed a plurality of radially extending ribs 20, which extend outwardly from the central portion 12 and terminate at the peripheral rib 14. Between two of the ribs, 20a and 20b, there is formed a vent membrane 22, of considerably thinner cross section than any other portion of the member 10.

Clearly, the sealing and insulating member 10 of FIG. 1 may be injection moulded of a suitable plastics material, as described hereafter.

For purposes of orientation of the member 10, if required, a portion of the central portion 12 of the member 10 is removed, as at 24. Also, it is noted that there is a downwardly extending cavity 26 formed in the central portion 12, and an upwardly extending cavity 28 formed in the underside of the central portion 12. The cavity 26 is terminated at its bottom end by a plug portion 30 which is described in greater detail hereafter.

Figure 3:
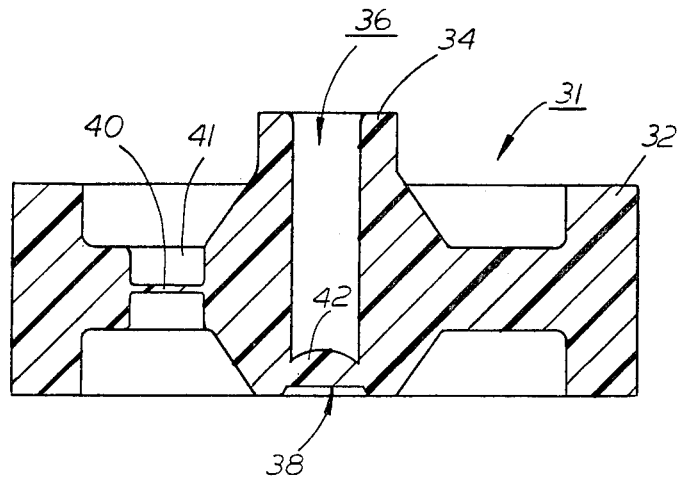
FIG. 3 is a cross section of another typical sealing and insulating member.
Figure 4:
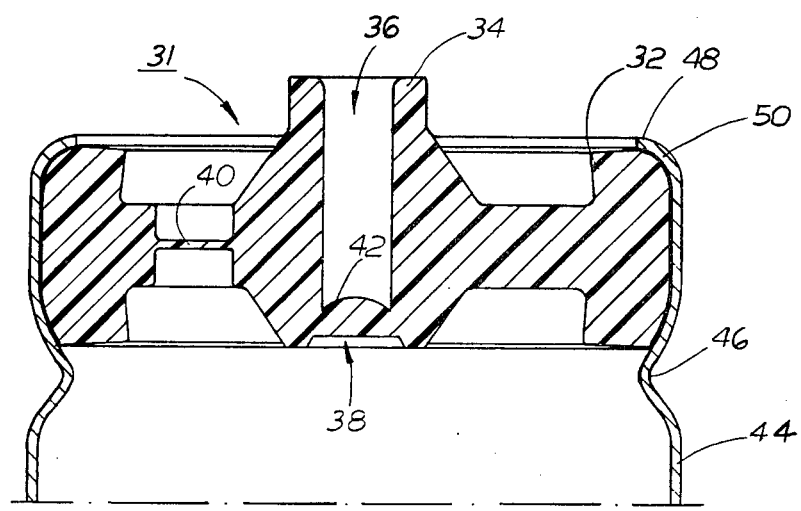
FIG. 4 is a cross section of the same member after it has been sealed by crimping to the top of a galvanic cell can.

FIGS. 3 and 4 show yet another typical embodiment of a sealing and insulating member according to the present invention. In this sealing and insulating member 31, which is not unlike that which may be utilized in sealed alkaline primary cells of the "AA" size, there is again formed a peripheral portion 32 and a central portion 34 into which there is a downwardly extending recess 36 and a upwardly extending recess 38 at its bottom side. A thin membrane portion 40 is provided, much as the membrane portion 22 of the embodiments of FIGS. 1 and 2, for purposes described hereafter. Also, as before, the recess 36 is terminated at its bottom by a plug portion 42.

With particular reference to FIG. 4, the crimping action of a can with respect to a sealing and insulating member according to this invention, is shown. In FIG. 4, the sealing and insulating member is that of FIG. 3, but it might be easily be that of FIG. 1; or, as discussed hereafter, may be any other specific configuration of sealing and insulating member which adopts and provides the features of the present invention.

In any event, it will be noted in FIG. 4 that a can 44 is provided, only the upper portion of which is shown. Near the top of the can 44 there is a bead 46. Also, the interior diameter of the can 44 above the bead is substantially the same as the diameter of the member 31 inserted in it, at least prior to the crimping action discussed hereafter.

It will be noted that the upper edge 48 of the can 44 has been crimped over a portion of the top periphery of the sealing and insulating member 31. Thus, it is noted that the sealing and insulating member is assembled into the cathode can, and is held in sealing relationship to the can by the crimp 50 formed at the top edge of the can 44, with the top edge 48 extending over the top periphery of the sealing and insulating member.

Figure 5:
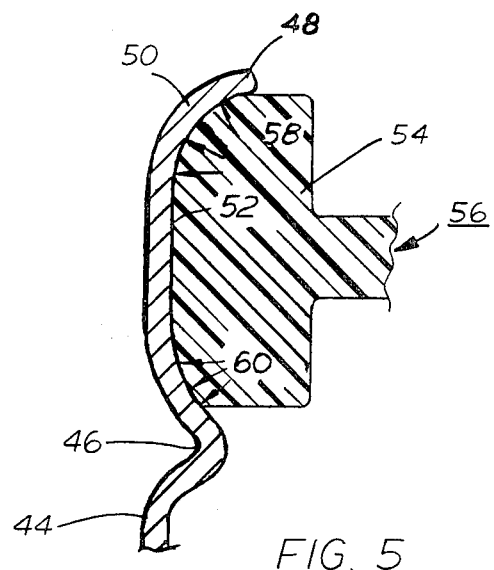
FIG. 5 is a schematic of a portion of a sealing and insulating member according to this invention, showing stress distribution after crimp sealing.

Referring to FIG. 5, a stress distribution diagram is shown, whereby it is indicated that there is at least some portion of the outer peripheral area 52 of the peripheral rib 54 of the general member 56 which is shown, that is stressed to varying amounts as shown by groups of arrows 58 and 60. These distributed forces are such that a stress gradient is formed, and the stress gradient is such that at least a first portion of the peripheral portion 52, as shown in FIG. 5, the thickness of the peripheral material at 54 has been stressed by the crimp 50—or by the crimping force which cause the crimp 50 as above the bead 46 at arrows 60—to an amount greater than the elastic limit of the material from which the sealing and insulating member 56 has been formed. At other portions of the peripheral edge 52, the peripheral material of the member 56 is stressed in an amount less than the elastic limit.

Figure 6:
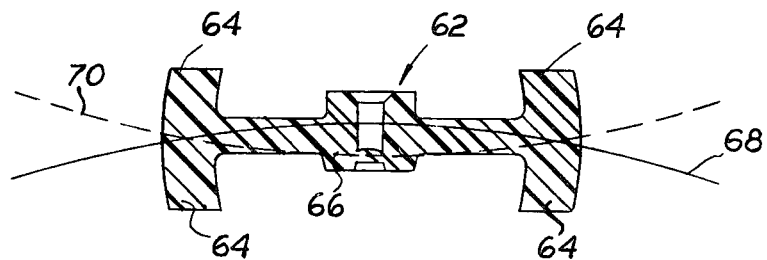
FIG. 6 is a schematic cross section of a typical sealing and insulating member showing various changes to its physical configuration that are accommodated and permitted according to this invention.

Likewise, referring to FIG. 6, it may be shown that there may be flexing of the peripheral material of a sealing and insulating member 62 at the peripheral portion 64 thereof, either at the top or bottom; and as well, there may be some change of elevation of the central portion 66. The change of elevation may generally be upwards, as shown by the dot-dash line 68; but it may be downwards as shown by the dashed line 70. In any event, the crimping force by which the crimp at the top edge of the can has been made, may cause flexing of the peripheral portions of the insulating and sealing member, or a change of elevation of the central portion of the sealing and insulating member with respect to the bottom of the can, which change of elevation may be up or down.

It should also be noted that, in all events, the crimping force by which the crimp is formed in the top of the can is such that the upper portions of the can near the top edge thereof are cold worked, so upon release of the crimping forces by removal of the can from the crimping die, the crimp remains and thus the stress distribution within the material of the sealing and insulating member also remains. Of course, the forces which cause the crimp of the cathode can of the sealed galvanic cell are such that at least some stress is caused to the plastics material of the sealing and insulating member; and according to the present invention, the dimensions of the sealing and insulating member and of the can and the height of the can above the bead are such that, when the crimp is formed, at least a portion of the peripheral material of the sealing and insulating member is stressed beyond its elastic limit and another portion of the peripheral material of the sealing and insulating member is not stressed beyond its elastic limit.

These latter characteristics become important when it is realized that, not only does the sealing and insulating member act to seal the can, it must continue to seal the can when the cell is subjected to extreme temperature and/or charging or discharging characteristics—leaving aside, for the moment, the question of pressure relief venting.

Thus, while it is recognized that the preferred materials, homo-polymers and co-polymers of polypropylene, have a greater temperature co-efficient of expansion than steel, as mentioned above the sealing and insulating member can be so dimensioned and proportioned that at least a portion of the periphery is stressed beyond its elastic limit and another portion of the periphery is not stressed beyond the elastic limits so that sealing of all temperatures may be assured. For example, if the cell is subjected to extremely cold temperatures, the sealing and insulating member may shrink to a greater extent than the can, and yet a seal is assured because of the characteristics referred to above. Likewise, if the cell is subjected to extremely high temperatures, the seal is again assured, although at a different portion of the periphery of the sealing and insulating member.

It is also to be noted that, when the crimping force acts against the can, certain hydraulic and pneumatic pressures may develop within the cell, and they can also be accommodated by the general flexing of the sealing and insulating member, particularly as indicated in FIG. 6.

To that end, it has been found to be convenient to add the radially extending ribs, such as those shown in FIGS. 1 and 2, especially to sealing and insulating members of larger size. Thus, the flexing characteristic of the member may be controlled, it being recognized that even a small percentage elevation change may be appreciable for larger diameter cells. The radially extending ribs preclude large excursions, while maintaining the other advantages described above. Moreover, the flexing of the sealing and insulating member is sufficiently controlled in the event of pressure build-up within the cell, so as to assure pressure relief venting of the cell through the rupturable membrane (when present), rather than expulsion of the entire member from the cell.

It has been mentioned that, notwithstanding the prior convention that the use of polyproplyene as an engineering material is not generally acceptable because of its different characteristics with respect to, inter alia, its thermal co-efficient of expansion as compared to those of nylon and steel, and notwithstanding the prior indication that polyproplyene may be a difficult material to mould, we have discovered that the use of homo-polymers and co-polymers of polyproplyene, particularly, permits the provision of sealing and insulating members for sealed galvanic cells where there may also be provided a rupturable membrane having specific dimensions of diameter and particularly thickness such that the membrane may be assured to rupture at a predetermined internal pressure within the cell being sealed.

Thus, having regard to the membrane cells 22 of FIGS. 1 and 2 or 40 of FIGS. 3 and 4, when the sealing and insulating members 10 or 31—or any other—is being injection moulded, the mould can be designed so that the thickness of the membrane 22 or 40 can be well controlled. This may be especially so, when the material is polypropylene or a co-polymer of polypropylene with polyethylene, where the melt index of the polypropylene is between 4 and 30, preferably between 9 and 14.

The melt index or melt flow index is an indication of the average molecular weight and melt viscosity of polypropylene. Resins having low melt flow indexes provide greater toughness, whereas resins having higher melt flow index have a better mould fill out, with possibly shorter mould cycles and a higher gloss on the moulded product. Specific examples of polypropylene materials, and other materials, are discussed hereafter.

It is to be noted, therefore, that homo-polymers and co-polymers of polypropylene may be very practical for moulding a thin membrane for vent purposes, and that there is no necessity to provide fracture lines or specifically designed cross-sections, and yet pressure relief valving may be assured.

It is generally considered more desirable that, in the event of pressure relief bursting of the membrane 22 or 40, the membrane should burst sufficiently well that there would be no secondary clogging of the vent passage 23 or 41, by any of the cell component materials which may flow through the vent passage in the event of pressure venting.

Figure 7:
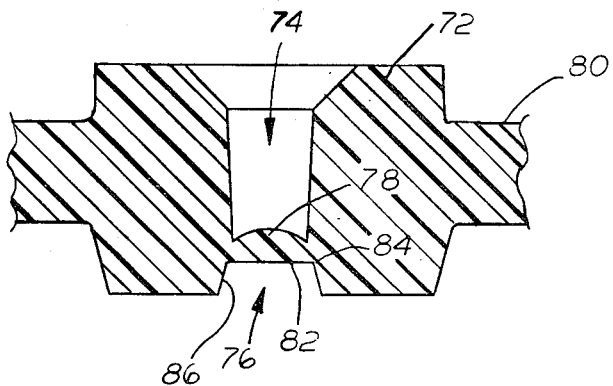
FIG. 7 is a cross section through the centre of a typical sealing and insulating member, to a larger scale, showing specific features of the design of that centre portion.

Turning to another aspect of the present invention, reference is now made specifically to FIG. 7. In FIG. 7, a central portion 72 of a sealing and insulating member according to the present invention is shown; and in the central portion 72 there is a downwardly extending recess 74 in the top thereof and an upwardly extending recess 76 in the bottom surface thereof. The recess 74 is subtended at its bottom by a plug portion 78.

It has been stated above that when the current collector is placed into a galvanic cell according to the present invention, that placement normally occurs by driving the current collector—which may have the general form and shape of a nail—through the sealing and insulating member at the top of the cell. For that reason, and because the normal geometry of the cell is such that the current collector member would be placed in the centre in an axial direction, the recess 74 is provided in the central portion 72 of the sealing and insulating member 80. However, when the current collector member is placed into the cell, its bottom end is placed into the recess 74 and thereafter the current collector member is forced downwardly into the cell. That passage of the current collector may be slow or fast, effected by such means as a press, or even by knocking the current collector member with a hammer.

Obviously, before the current collector member is placed into the recess 74, the galvanic cell having the sealing and insulating member 80 at its top is completely sealed. It may sometimes be desirable to build the cells in one manufacturing plant and to ship them to another plant without the current collector and jacket, for the final manfuacturing steps to be performed at that other location. In any event, when the current collector member is placed into the cell, it is necessary to pierce the sealing and insulating member 80.

Frequently, in the past, the current collecting member has simply pierced the gasket member at the top of the cell, and has caused considerable fracture of the underside of that member, or has driven a considerable portion of the underside of the member into the cell. However, according to the present invention, those unwanted characteristics are overcome, and moreover assurance is made that there should be no electrolyte leakage around the current collector member. Thus, the current collector member is dimensioned so as to fit tightly into the recess 74. When the bottom of the current collector member contacts the plug portion 78, the present invention provides that the plug portion 78 shall be driven out as a single element and fall into the cell; but by so doing, there is no fracture on the underside of the member 80 nor is there more than the very small plug element 78 driven into the interior of the cell.

This characteristic is particularly accomplished by forming the upper surface of the plug portion 78 as a segment of a sphere—i.e., there is a radius of curvature of the upper surface of the plug portion 78 in cross-section. Moreover, the upper surface 82 of the recess 76 is planar, and terminates at a relatively sharp corner 84. Preferably, the corner 84 which defines the limitation of the planar surface 82 is so placed that, the sloping sides 86 of the recess 76 form a substantial tangent to the curvature of the upper side of the plug portion 78.

By these means, a clean fracture of the plug portion 74 is assured because there is an induced fracture line or stress concentrator line from the extreme outer edge of the upper surface of the plug portion 78 to the extreme outer edge of the planar surface 82.

These features are also accommodated and can be predicated with relative accuracy, when the sealing and insulating member is formed from a homo-polymer or co-polymer of polypropylene as discussed hereafter. These features are also particularly noteworthy when it is generally considered that the design of any member to be injection moulded of a plastics material would normally be such that stress concentration is to be avoided.

Materials that have been contemplated and of which sealing and insulating members according to the present invention have been moulded include the following filled or unfilled resins: polypropylene, polyethylene, co-polymers of polypropylene with polyethylene, nylon, polysulfone, polyphenylene oxide, and acrylonitrile-butadiene-styrene terpolymer.

However, polypropylene and co-polymers of polypropylene with polyethylene, where the melt index of the polypropylene is between 4 and 30, and preferably between 9 and 14, have yielded particularly acceptable results.

For example, batches of alkaline primary cells have been assembled having sealing and insulating members with a configuration substantially as shown in FIGS. 1 and 2, and made from differing materials.

In one test, samples were made of nylon and of a polypropylene homo-polymer available from Shell Chemical Company and identified either as Shell SM6100 or SY6100, or Shell polypropylene 5820. (Such polypropylene homo-polymers are used, among other purposes, for preparation of polypropylene yarn for use in carpets and the like.) With nylon and Shell SM6100 polypropylene cells, it was noted that substantially identical long term and high temperature storage characteristics were obtained; but that the cells having the nylon sealing and insulating members showed much higher leakage characteristics following low temperature storage, and following low temperature to high temperature cycling. In other tests, the temperature cycling was followed immediately by shock and vibration testing, and in all events by discharge testing. In all cases, the cells having the polypropylene sealing and insulating members showed better characteristics and fewer leaks, particularly in the crimp area.

These tests are even more remarkable when it is noted that, with a nominal diameter of 1.237 inches, the polypropylene members were approximately 0.006 to 0.010 inches less in diameter than the nylon tops.

In other tests using sealing and insulating members made of nylon and of Shell SM6100 polypropylene homo-polymer, having a general configuration of that shown in FIGS. 3 and 4, similar results were obtained. Those cells were of the size "AA" variety. In those tests, following storage of one week at minus 40 degrees C., several of the cells having the nylon sealing and insulating members leaked at the crimp, and none of the cells having the polypropylene members leaked. Further, after extreme temperature cycling (minus 40 degrees C. to plus 71 degrees C., once each day for one week) a number of the cells having the nylon sealing and insulating members leaked at the crimp or through the vent, whereas only a few of the cells having the polypropylene member showed any evidence of crimp leakage.

In yet other tests, a variety of different homo-polymers and co-polymers of polypropylene were used. They included the same Shell SM6100 polypropylene homo-polymer, and Shell 5550, 5820 and SY6100 homo-polymers, as well as Hercules 6523 and 6323 homo-polymers and Hercules 7523 co-polymer (with polyethylene). In those tests, using size "D" cells, and having a sealing and insulating member of a general configuration of FIGS. 1 and 2, it was determined that the cells which were made having polypropylene with a melt index particularly in the range of 9 to 14 showed much better leakage characteristics after prolonged high temperature storage or after temperature cycling than others having melt indexes which were very low or very high.

Moreover, it was determined that the venting pressures of all such cells, where the membrane thickness of the membrane 22 was 0.005 to 0.0055 or 0.006 inches thick, range from 280 PSI to 425 PSI, with the cells having the sealing and insulating members made with a polypropylene having a melt index of approximately 9 to 14, and having a venting pressure of approximately 340 or 350 PSI.

The tensile yield strength of Shell SM6100 polypropylene homo-polymer is 5100 PSI at 23 degrees C., and there is an approximate elongation of 10% at yield.

All of the sealing and insulating members formed of a homo-polymer or co-polymer of polypropylene were annealed, following moulding, before assembly into the cells; and all of the cells were built using a standard sealant around the bead and the current collector.

As noted, polypropylene and co-polymers of polypropylene with polyethylene and other materials may be glass filled, but more generally they are not. In any event, such materials are inert to electrolyte materials of such galvanic cells as manganese alkaline cells, as well as such materials as dimethyl ether, so that they may be used in other galvanic cells including lithium manganese dioxide cells and the like.

Notwithstanding the fact that the thermal co-efficient of expansion of polypropylene differs from that of steel more than does the thermal co-efficient of expansion of nylon, many cells have been built having homo-polymers and co-polymers of polypropylene, where the sealing and insulating members have been moulded having the same design as other members made of nylon; and in all events the cells having the polypropylene members have performed better, especially after severe temperature cycling.

Moreover, the present invention provides not only for some flexing of the central portion of any sealing and insulating member—especially when such members are formed of homo-polymers or co-polymers of polypropylene—but so also is there a provision for flexing of peripheral portions of the sealing and insulating members. Furthermore, the provision is made, in all events, that at least a portion of the peripheral material of the member is stressed beyond its elastic limit because of the crimp which holds the member in place above the bead formed in the cell can, and that other portions of the peripheral material of the member which are not stressed beyond the elastic limit of the material.

It has been noted that cells have been constructed where the sealing and insulating member has a thin membrane moulded therein, so as to provide venting relief of the cell if the pressure within the cell reaches a predetermined limit. Such pressure relief membranes have been easily moulded using homo-polymers and co-polymers of polypropylene, especially when the melt index of the polypropylene is between 9 and 14.

Still further, a sealing and insulating member for sealed galvanic cells is provided whereby considerable dimensional variations of the can and/or the moulded member can be accommodated, because of the crimping force and the stress gradient in the peripheral material of the member, whereby integrity against electrolyte leakage may be assured.

A configuration of the central portion of a sealing and insulating member for galvanic cells has been taught, whereby chemical packages—cells without the current collector, jacket or cap—may be assembled in one plant at one time, and the cells with current collectors, jackets and caps may be finally assembled elsewhere at a different time, with the assurance that there should be no leakage of electrolyte around the current collector and with the further assurance that placement of the current collector by driving it through the sealing and insulating member will not damage the member. This is because the present invention provides a configuration whereby the bottom of the recess accommodating the current collector is knocked out as a plug, and the size and configuration of that plug can be accurately predicted and designed for.

When any sealed galvanic cell is assembled, the crimping forces by which the crimp is formed around the top of the can are such that a crimp of the metal is assured. In other words, when the crimping operation is concluded, and the cell removed from the crimping die in which the crimping operation has taken place, a permanent set of the metal can material has occurred, such that forces are set up against the plastics material of the sealing and insulating member. By proper dimensioning of the sealing and insulating member, stress distribution is assured, so that there will always be a portion that has been stressed beyond the elastic limit and a portion that has not been stressed beyond the elastic limit. Thus, integrity of the cell against electrolyte leakage, during and following temperature cycling and deep discharge, reverse polarity or charging operation in some instance, is assured. Moreover, flexing of the material of the sealing and insulating member, either upwardly or downwardly with respect to the bottom of the can, or inwardly at the crimp and bead, and either because of the crimping forces or as temperature changes occur, are accommodated by the sealing and insulating members of the present invention.

Thus, dimensional variations of the can and/or of the sealing and insulating member can be accommodated, both with respect to diameter and height of the member or its relationship to the height of the top of the can above the bead.

Stress relief, and thus stress gradient generation upon crimping of the sealing and insulating members, is more greatly assured if the members are annealed after they have been moulded, following their cooling cycle after ejection from the moulds. Thus, there is sure to be a region in the periphery of the member that has been stressed beyond the elastic limit and at least another region that has been stressed well below the elastic limit of the plastics material, and thereby sealing integrity is assured.

Finally, when homo-polymers and co-polymers of polypropylene are used, including the preferred homo-polymer identified as Shell SM6100, considerable cost savings in the production of sealing and insulating members according to the present invention, and even in the acquisition of the resins from which such members are formed, may be achieved.

Other embodiments than those referred to specifically above, and other materials than those mentioned, may of course be used, and other sealed galvanic systems than those referred to may utilize the present invention, without departing from the spirit and scope of the appended claims.

What is claimed is:

1. In combination, a cylindrical sealed galvanic cell, having an anode, a cathode, and a generally cylindrical can into which the principal components of the cell are placed, said can having a closed bottom end and an opened top end and said can having an inwardly extending bead formed near the top end thereof; and further comprising;

a sealing and insulating member at the top end of said cathode can, having a bottom peripheral edge seated on said bead, said member being held in sealing relationship to said can by a crimp formed at the top edge of said can, with said top edge of the can extending over the top periphery of said member;

said sealing and insulating member having a circular rib formed at its periphery at least in one of its top and bottom surfaces, wherein at least a first portion of the thickness of the peripheral material of said member being stressed by said crimp in an amount greater than the elastic limit of said material; and at least a second portion of the thickness of the peripheral material of said member being stressed by said crimp in an amount less than said elastic limit; said portion which has been stressed beyond the elastic limit being at the top or bottom periphery of said member.

2. In combination, a cylindrical sealed galvanic cell, having an anode, a cathode, and a generally cylindrical can into which the principal components of the cell are placed, said can having a closed bottom end and an opened top end and said can having an inwardly extending bead formed near the top end thereof; and further comprising:
- a sealing and insulating member at the top end of said cathode can, said member being held in sealing relationship to said can by a crimp formed at the top edge of said can, with said top edge of the can extending over the top periphery of said member;
- said sealing and insulating member having a circular rib formed at its periphery at least in one of its top and bottom surfaces, wherein said sealing and insulating member is formed with a centrally disposed portion having a thickness greater than the surrounding material, and having a downwardly extending recess subtended at its bottom by an integrally formed plug portion which is thinnest in cross-section around its periphery; and where the underside of said plug portion terminates at an upwardly extending recess having a planar top surface and downwardly and outwardly extending sides, the diameter of said planar top surface of said upwardly extending recess being greater than the diameter of said downwardly extending recess.

3. The combination of claim 2, wherein the upper surface of said plug portion has a radius of curvature, and said upwardly extending recess is formed so that the extension of said sides is substantially tangential to the curvature of the upper surface of said plug portion.

4. The combination of claim 1, wherein said sealing and insulating member is formed so that the crimping action by which said crimp is formed at the top edge of said can, crimping said top edge against said member, causes a slight change of elevation of the central portion of said member with respect to the bottom of said can.

5. In combination, a cylindrical sealed galvanic cell, having an anode, a cathode, and a generally cylindrical can into which the principal components of the cell are placed, said can having a closed bottom end and an opened top end and said can having an inwardly extending bead formed near the top end thereof; and further comprising:
- a sealing and insulating member at the top end of said cathode can, said member being held in sealing relationship to said can by a crimp formed at the top edge of said can, with said top edge of the can extending over the top periphery of said member;
- said sealing and insulating member having a circular rib formed at its periphery at least in one of its top and bottom surfaces, where a current collector member extends through a central portion of said sealing and insulating member and into said anode; and said sealing and insulating member is formed so that at least one portion of the area thereof, other than at that place where said current collector will extend through said material and other than at said peripheral rib, is formed with a thickness less than the surrounding material so as to provide a rupturable vent area of said member in the event that pressure within said sealed galvanic cell reaches a predetermined level, wherein said peripheral rib of said sealing and insulating member is formed at least in said top surface, and a plurality of substantially equally spaced radially extending ribs is also formed at least in said top surface, emanating from a centrally disposed hub and terminating at said peripheral rib; and said vent portion is disposed between a pair of said radially extending ribs.

6. The combination of claim 1, where the material of said sealing and insulating member is chosen from the group consisting of polypropylene and co-polymers of polypropylene with polyethylene, and the melt index of said polypropylene is between 4 and 30.

7. The combination of claim 1, wherein said sealing and insulating member is formed with said peripheral rib in at least its top surface, and a plurality of radially extending ribs is also formed at least in said top surface, emanating from a centrally disposed hub and terminating at said peripheral rib.

8. In combination, a cylindrical sealed galvanic cell, having an anode, a cathode, and a generally cylindrical can into which the principal components of the cell are placed, said can having a closed bottom end and an opened top end and said can having an inwardly extending bead formed near the top end thereof; and further comprising:
- a sealing and insulating member at the top end of said cathode can, said member being held in sealing relationship to said can by a crimp formed at the top edge of said can, with said top edge of the can extending over the top periphery of said member;
- said sealing and insulating member having a circular rib formed at its periphery at least in one of its top and bottom surfaces, where a current collector member extends through a central portion of said sealing and insulating member and into said anode; and said sealing and insulating member is formed so that at least one portion of the area thereof, other than at that place where said current collector will extend through said material and other than at said peripheral rib, is formed with a thickness less than the surrounding material so as to provide a rupturable vent area of said member in the event that pressure within said sealed galvanic cell reaches a predetermined level, wherein said sealing and insulating member is formed with said peripheral rib in at least said top surface, and a plurality of radially extending ribs is also formed at least in said bottom surface, emanating from a centrally disposed hub and terminating at said peripheral rib; and said vent portion is disposed between a pair of said radially extending ribs.

* * * * *